United States Patent [19]
Takao

[11] 4,409,162
[45] Oct. 11, 1983

[54] PROCESS FOR PRODUCING ACRYLONITRILE SEPARATION MEMBRANES IN FIBROUS FORM

[75] Inventor: Seiji Takao, Okayama, Japan

[73] Assignee: Japan Exlan Company Limited, Japan

[21] Appl. No.: 195,058

[22] Filed: Oct. 7, 1980

Related U.S. Application Data

[63] Continuation of Ser. No. 22,367, Mar. 20, 1979, abandoned.

[30] Foreign Application Priority Data

Apr. 3, 1978 [JP] Japan ................................. 53-39334
Apr. 5, 1978 [JP] Japan ................................. 53-40582

[51] Int. Cl.$^3$ ....................... B29D 27/04; B01D 31/00
[52] U.S. Cl. ................................. 264/41; 210/500.2; 264/182; 264/209.1
[58] Field of Search ............... 210/500.2, 490; 264/41, 264/206, 182, 216, 201, 209

[56] References Cited

U.S. PATENT DOCUMENTS 3,950,257  4/1976  Ishii et al. .......................... 210/500.2
4,066,731  1/1978  Hungerford ........................ 264/216
4,173,606  11/1979  Stoy et al. ..................... 210/500.2 X Primary Examiner—Frank A. Spear, Jr.
Attorney, Agent, or Firm—Wenderoth, Lind & Ponack

[57] ABSTRACT

A process for producing hollow acrylonitrilic separation membranes in fibrous form which comprises shaping a membranous product in hollow fibrous form from a solution of acrylonitrile polymer dissolved in formamide-containing dimethylformamide while maintaining the temperature of said polymer solution within a specified range and subjecting said membranous product to a solvent removal treatment under a specific condition, thereby producing an acrylonitrilic separation membrane which is asymmetric, porous in structure, and excellent both in separation ability and in mechanical strength.

8 Claims, No Drawings

PROCESS FOR PRODUCING ACRYLONITRILE SEPARATION MEMBRANES IN FIBROUS FORM

This is a continuation of Ser. No. 22,367, filed Mar. 20, 1979, now abandoned.

BACKGROUND OF THE INVENTION

1. Field of the Invention

The present invention relates to a process for producing acrylonitrilic separation membranes. More specifically, the invention is concerned with a process for producing an acrylonitrilic separation membrane which comprises shaping a membranous product of a desired form from a solution of a polymer of acrylonitrile (hereinafter abbreviated as AN) dissolved in formamide-containing dimethylformamide (dimethylformamide hereinafter abbreviated as DMF) while maintaining the temperature of said polymer solution within a specified range and removing the solvent from the membranous product or performing the solvent removal under a specific condition, whereby an AN separation membrane (AN filtration material) which is asymmetric, porous in structure and excellent both in separation ability and in mechanical strength is produced.

2. Description of the Prior Art

In recent years, for a wide variety of applications including waste water treatment, desalination of sea water, food industry, medical treatment, etc., separation methods for various substances using semi-permeable membranes have been given attention and have been subjected to further development.

Among such separation methods by means of semi-permeable membranes, there have been proposed various techniques such as ultrafiltration, reverse osmosis, etc., depending upon the particle size of the substance which is suspended, dispersed or dissolved in an aqueous medium. It goes without saying that the properties required for the membrane should be different depending on the methods of separation but among the properties commonly required there can be mentioned a high permeation rate of the aqueous medium, excellent rejection ability, a sufficient mechanical and chemical strength, etc.

A great number of semi-permeable membranes are known at present, but it is not an exaggeration to say that there is no membrane at present which satisfies the above-mentioned properties to a practical level. For example, even in the case of cellulose acetate membranes which are regarded as being relatively practical, defects are observed particularly in resistance to chemicals and resistance to microbic decomposition. On the other hand, because AN polymer membranes are originally excellent in chemical properties, various methods of membrane formation from AN polymers have been proposed. These methods can be known from Japanese KOKAI (Laid-Open) Patent Application No. 53258/1974 (a method wherein the coagulating agent has different coagulation values at both sides of the membrane); Japanese KOKAI Patent Application No. 62380/1974 (a sheath-core type composite extrusion method); Japanese KOKAI Patent Application No. 92359/1975 (a method wherein a mixed solvent is used); Japanese KOKAI Patent Application No. 117682/1975 (a method wherein a sol membrane is formed, followed by solvent evaporation and desolvation), etc. These methods involve disadvantages such as low productivity or membrane thickening (thickening of the membrane layer which has separation activity) and therefore they are not useful from an industrial viewpoint.

STATEMENT OF THE INVENTION

In view of such situation, we have conducter intensive research to overcome the above-mentioned defects and to produce acrylonitrilic porous membranes having excellent separation ability. As a result, we have found that, by using formamide-containing DMF as the solvent for AN polymers and specifying the temperature of an AN polymer solution for membrane formation or specifying said temperature and solvent removal conditions, it is possible to produce acrylonitrilic separation membranes which are excellent in mechanical strength and asymmetric in structure and which exhibit a suitable range of permeation rate and rejection ability. The present invention is based on this discovery.

An object of the present invention, therefore, is to provide a process for producing acrylonitrilic separation membranes which are asymmetric in structure, and of which the permeation rate and rejection ability can be adjusted to a suitable range.

Another object of the present invention is to provide an industrially advantageous process for producing acrylonitrilic porous membranes excellent in mechanical strength, in which process the recovery and refining of the solvent is easy.

A further object of the present invention is to provide a process for producing acrylonitrilic separation membranes which enables one to design separation abilities in conformity with various fields of use such as, for microfiltration membranes, ultrafiltration membranes, base material for reverse osmotic membranes, etc.

The above-mentioned objects of the present invention can be attained by dissolving an AN polymer in formamide-containing DMF to prepare an AN polymer solution for membrane formation; shaping the solution into a membranous product of a desired form while maintaining the temperature of the solution above the gellation temperature (which will be mentioned later); and removing the solvent, or carrying out the solvent removal under a specific condition followed by stretching the solidified membrane thus obtained.

By employing this process, the separation-active layer (the layer with which the solution of a substance to be separated comes directly into contact) of the liquid membranous product shaped into a desired form from an AN polymer solution which is in a sol state, can form a smooth, dense structure because a sol-to-gel conversion takes place owing to a decrease in the temperature after shaping, in connection with selection of the composition and temperature of the AN polymer solution. That is to say, because of a decrease in the temperature, the AN polymer agglomerates to some degree to convert to a mobility-decreased state (sol-to-gel conversion), and during this conversion, the solvent removal occurs, so that a dense structure can be easily formed. On the other hand, at the supporting layer side of the membrane (the layer side lying opposite to the active layer), solidification occurs as a result of the solvent removal treatment, so that a fixed, solid structure is formed. Furthermore, this solvent removal phenomenon proceeds from the active layer to the layer portion lying opposite thereto, and the pore size of the porous structure, as seen in a cross-section of the membrane, is characterized by a gradient in which the pore size is smaller in the active layer and larger in the supporting layer. (Because the solidification by the action of the solvent removal agent is preferential to the gellation due to the sol-to-gel conversion which proceeds from the active layer towards the supporting layer owing to the temperature drop, the solidification by the action of the solvent removal agent gradually becomes more predominant towards the supporting layer, so that the polymer precipitates in a coarser structure in the supporting layer. Of course, this precipitation behaviour is dependent on the selection of the composition and temperature of the AN polymer solution). In this way, since both sides of the membrane gel or solidify in different mechanisms, the membrane has a peculiar pore distribution, and in actual practice, this increases the treating capacity in the separating operation. The solvent removal is accomplished by employing a difference between the concentrations of the coagulant in the coagulating solutions coming in contact with the two sides of the membrane and/or between the temperatures of the coagulating baths. But by specifying the condition of the solvent removal treatment as in the present invention, the gellation or solidification at both sides of the above-mentioned membrane proceeds more effectively, namely the pores formed at the active layer side and the supporting layer side can be arranged according to the above-mentioned particular size distribution (gradient). Consequently, it has now become possible to obtain acrylonitrilic separation membranes remarkably improved in membrane properties, such as water permeation rate, rejection ability, mechanical strength, etc.

DESCRIPTION OF PREFERRED EMBODIMENTS

The AN polymers used as the starting materials for the porous membranes of the present invention are those obtained by known processes, and it is preferable that the polymers are those produced from AN only or those containing combined therewith more than 80 weight % of AN units. If the AN content is less than 80 weight %, the membrane obtained will be insufficient in resistance to chemicals, affinity to water and thermal resistance. The molecular weight of such AN polymers, represented by limiting viscosity $[\eta]$ as measured in DMF at 30° C., is preferably within the range of from 0.4 to 4. If the molecular weight is too small, the membrane will be inferior in membrane-forming ability, mechanical strength and water resistance. Too large a molecular weight will also result in poor membrane-forming ability. As monomers to be copolymerized with AN, there can be used known comonomers that can be copolymerized with AN, for example, conjugated diene monomers such as butadiene, isoprene, etc.; aromatic vinyl monomers such as styrene, $\alpha$-methylstyrene, chlorostyrene, etc.; nitrile monomers such as methacrylonitrile, vinylidene cyanide, etc.; acrylic acid esters such as methyl acrylate, ethyl acrylate, butyl acrylate, etc.; methacrylic acid esters such as methyl methacrylate, ethyl methacrylate, butyl methacrylate, etc.; vinyl and vinylidene halides such as vinyl chloride, vinyl bromide, vinylidene chloride, vinylidene bromide, etc.; vinyl esters such as vinyl acetate, vinyl propionate, etc.; ethers such as ethyl vinyl ether, butyl vinyl ether, etc.

Firstly, an AN polymer as mentioned above is dissolved in a solvent to prepare a solution for membrane formation. As the solvent used in the present invention, it is essential to use formamide-containing DMF. The mixing ratio of formamide and DMF is determined depending on the composition of the AN polymer, its molecular weight, the concentration of the polymer in the solution for membrane formation, etc. However, it is preferable to select the mixing ratio from the range of about 1/99 to 28/72, from the standpoint of the final properties including mechanical strength, water permeation rate and rejection ability of the membrane. If necessary, to the formamide-DMF mixed solvent system, there may be added other additives which are compatible with said mixed solvent, for example water, dioxane, dimethyl sulfoxide, dimethylacetamide, acetone, ethylene carbonate, organic fatty acids, alcohols, glycols, or inorganic salts, alone or in a combination of two or more of these compounds. The mixing ratio of these additives should be less than 5 % based on the total weight of the formamide-DMF mixed solvent.

The concentration of the AN polymer in the solution for membrane formation should be maintained within the range of from 10 to 35 weight %, preferably from 20 to 30 weight %, based on the total weight of the solution. Too low or too high a polymer concentration gives a poor membrane-forming ability and therefore such concentrations are not desirable.

The AN polymer solution for membrane formation comprising an AN polymer, mixed solvent, and additive(s) added as required, is dissolved and deaerated. The dissolution can be performed by any method. (For example, when heating under stirring is employed, the solution is heated at a temperature of about 60° C. to 80° C. for one to three hours.) However, in any case, employment of a temperature lower than the gellation temperature which will be mentioned later must be avoided.

The solution for membrane formation thus prepared, while being maintained at a temperature above the gellation temperature, is shaped into a membranous product such as flat film, tube, hollow fiber, etc. by spreading the solution over a flat plate, endless belt, rotary drum, etc. or by extruding the solution through a spinnerette orifice in the form of a slit or a ring. If the temperature of the solution for membrane formation is less than the gellation temperature, the gellation proceeds all the way in the direction of the thickness of the membrane, so that there will be a difficulty in the formation of asymmetry in membrane structure and in the formation of a dense thin layer having separation ability. The preferable temperature range of the solution for membrane formation is comprised between temperatures which are by 1° to 50° C. higher than the gellation temperature of the solution. The gellation temperature defined in the present invention will be explained in the following: An about 150 to 180 g quantity of a sample solution is poured into a beaker which is about 5.5 cm in diameter and about 11 cm in height. This beaker is dipped into a temperature-controllable water bath maintained previously at the same temperature level as the dissolution temperature. The temperature of the solution is then lowered at the rate of about 10° C./hour, accompanied by the temperature lowering of the water bath. At a given point in time during this temperature lowering, a commercially available glass rod which is 3 mm in outer diameter and 2.5 g in weight, is placed vertically on the surface of the solution while being supported lightly at its upper portion by a ring-shaped holder. The glass rod penetrates into the solution under the action of its own weight and sinks. The time elapsed until a sinking depth of 5 cm in attained, is measured. The solution temperature at which the time elapsed first exceeds 5 seconds is defined as the gellation temperature of the solution. Such a gellation temperature is always inherently present in any solution for membrane formation composed of an AN polymer, mixed solvent, etc. Some examples of gellation temperatures which we measured are shown in Table 1 below. The AN polymer used in this measurement of gellation temperatures was an AN/vinyl acetate (88/12) copolymer having a limiting viscosity $[\eta]$ of 0.97.

TABLE 1

| AN copolymer concentration (%) | DMF (%) | Formamide (%) | Others (%) | Gellation temperature (°C.) |
|---|---|---|---|---|
| 30 | 60 | 10 | — | 75 |
| 25 | 74 | 1 | — | 45 |
| 25 | 68 | 7 | — | 60 |
| 20 | 75 | 5 | — | <20 |
| 20 | 72 | 8 | — | 50 |
| 20 | 70 | 10 | — | 55 |
| 15 | 75 | 10 | — | <20 |
| 15 | 73 | 12 | — | 42 |
| 10 | 75 | 15 | — | <20 |
| 10 | 73 | 17 | — | 35 |
| 25 | 68 | 5 | Water 2 | 70 |
| 25 | 68 | 5 | Methanol 2 | 55 |
| 25 | 68 | 5 | Dioxane 2 | 55 |
| 25 | 68 | 5 | DMSO* 2 | 45 |

*DMSO = Dimethyl sulfoxide

The thus formed sol membrane is then subjected to a solvent removal treatment, immediately or after being caused to pass through an inert atmosphere. As regards the condition for the solvent removal treatment, there are no particular restrictions, and the usual coagulating condition is employed. That is to say, the usual coagulating agents, namely aqueous solutions of acrylic fiber solvents (DMF, dimethyl sulfoxide, dimethylacetamide, thiocyanates, $\gamma$-butyrolactone, etc.) are used. However, from the viewpoint of producing asymmetric, porous acrylonitrilic separation membranes, it is desirable to employ a difference between the concentrations of the coagulant in the coagulating bath liquids coming into contact with the two sides of the membrane, and/or between the coagulating bath temperatures. Inert atmospheres also belong to a class of mediums for solvent removal treatment, and in the present invention, either method may be employed.

The optimum condition of the solvent removal treatment is to bring one side of the sol membrane into contact with an aqueous solution at a temperature below 15° C. containing at least 20 weight % of a water-soluble solvent compatible with said mixed solvent (said aqueous solution referred as solvent removal treatment medium A), immediately or after bringing it once into contact with an inert atmosphere; and to bring the other side of the membrane immediately into contact with an aqueous solution at a temperature above 0° C. containing less than 50 weight % of a water-soluble solvent compatible with said mixed solvent or an inert medium (said aqueous solution or said inert medium referred to as solvent removal treatment medium B), or to bring it into contact with said solution after bringing it once with an inert atmosphere. If any of these steps of solvent removal treatment is lacking, it is difficult to produce a separation membrane which can ensure well-balanced membrane properties such as water permeation rate, rejection ability, etc. Concrete embodiments of the solvent removal treatment are emplained in the following, with respect to hollow fiber-shaped membranes and flat membranes. In the case of the hollow fiber-shaped membrane, the hollow portion of the membrane is immediately brought into contact with the above-mentioned B medium by employing a suitable spinnerette, and the surface layer of the membrane is brought into contact with the A medium (outer bath) which surrounds the surface layer, immediately or after being brought into contact with an inert atmosphere. In the case of flat membranes, the two surfaces of the membrane formed by employing a spinnerette having a suitable slit so as to separate said two surfaces, are brought into contact respectively with the A medium and B medium, immediately or after both surfaces have been once brought into contact with an inert atmosphere. In the case of hollow fiber-shaped membranes, the supply rate of the B medium to be introduced into the hollow portion is not particularly limited, but from the viewpoint of improving the properties of the final membrane, it is desirable to employ a quantity in the range of from the same to about 1/50 as much as the supply quantity of the solution for membrane formation. The above-mentioned water-soluble solvents and inert media used in the present invention include, for example, dimethylacetamide, dimethyl sulfoxide, $\gamma$-butyrolactone, ethylene glycol, nitric acid and inorganic salts, as a single compound or as mixtures, and air and nitrogen. Among the above-mentioned inert atmospheres, air is generally used.

The best way of use of the A and B media as well as the inert atmosphere is that the A medium contains more than 30 weight % of a said water-soluble solvent and is used at a temperature below 10° C.; that the B medium contains less than 30 weight % of said water-soluble solvent and is used at a temperature above 10° C.: and that the inert atmosphere is used at a temperature between room temperature and 150° C.

Whether the sol membrane shaped into a desired form should be subjected to solvent removal treatment immediately or after contact with an inert atmosphere should be suitably decided, taking account of the practical use of the finally obtained membrane.

The solidified membrane produced after this solvent removal treatment is then subjected to water-washing and stretching, and if necessary to heat-treatment. Preferably, this stretching is carried out so that that the membrane is stretched 0.8 to 1.5 times, based on the size of the solidified membrane, monoaxially or biaxially, at a temperature above 50° C., preferably above 80° C. The heat-treatment performed as required is carried out in a bath containing water and/or polyethylene glycol or glycerine, at a temperature between 50° and 100° C., preferably between 80° and 100° C.

As previously mentioned, in producing an acrylonitrilic asymmetric separation membrane, when the process of the present invention is employed wherein a solution of an AN polymer in formamide-containing DMF is shaped and solidified under a particular condition. There can be obtained an acrylonitrilic asymmetric membrane having a high separation ability, of which the separation-active portion and supporting portion are formed by different mechanisms and of which the separation-active surface is smooth.

According to the process of the present invention, the solvent evaporation step is not always necessary, and therefore this facilitates continuous production of membranes in producing various types of membranes. At the same time there is also an advantage that evaporated solvent can be easily recovered.

On the basis of the principle of said solvent removal mechanisms, the pore size of the membrane can be easily controlled, and therefore there is also an advantage in that various separation membranes can be produced so as to conform with the desired uses and properties of the membrane.

The acrylonitrilic separation membrane produced according to the present invention can be used directly not only as a microfiltration membrane, ultrafiltration membrane, base material for reverse osmotic membrane, diaphragm, etc., but also can be used, after re-dissolving one side of the membrane, coating said side with another component and heat-treating the membrane at a high temperature, as a reverse osmotic membrane.

For a better understanding of the present invention, representative examples of the invention are shown in the following, but it is to be understood that the present invention is not limited in scope by these examples, in which all percentages and parts are by weight unless otherwise indicated.

The water permeation rate and percent rejection were measured or calculated respectively by the following methods:

(1) Water permeation rate F $(m^3/m^2.day.(kg/cm^2))$

A 0.5% aqueous solution of Dextran T-110 (a melt sugar indicated as having a weight average molecular weight of 1,060,000; produced by Pharmacia Fine Chemicals) was used as the test solution. A test specimen (prepared in such a way that several membranes in the form of hollow fibers were bundled into a loop and an about 5 cm portion from one end opposite to the loop was hardened with an epoxy resin) was placed in a pressure filtration apparatus, and the test solution was put to the outer side of the test specimen. A pressure difference of 10 kg/cm$^2$ was set up between the test solution side and the permeated liquid side (the permeated liquid flows out of the hollow portion of the hollow fibers), and the amount of the permeated liquid was measured, from which the water permeation rate (F) per unit membrane area per unit time was calculated. The greater the water permeation rate (F), the better is the efficiency of the separation membrane.

(2) Percent salt rejection R (%) was calculated from the following general formula (1):

$$R = (1 - C/C_o) \times 100 \quad (1)$$

wherein $C_o$ represents the concentration of Dextran T-110 in the above-mentioned test solution, and C represents the concentration of Dextran T-110 in the permeated solution at the time-point at which 5% of the amount of the test solution has permeated. The greater the value R, the greater is the rejection ability.

EXAMPLE 1

Twenty five parts of an AN polymer containing 88% AN and 12% vinyl acetate combined therewith (having a limiting viscosity [η] of 0.95 as measured in DMF at 30° C.) was dissolved in 75 parts of each of the mixed solvents shown in Table 2, and the solutions were deairated to prepare solutions for membrane formation. (The gellation temperatures of the solutions are also shown in Table 2.) Each solution, while being maintained at 65° C., was spun through a sheath-core type spinnerette into air in which it was caused to travel for a length of 185 mm, and was introduced into a 40% DMF solution (4° C.) to subject it to a solvent removal treatment. During this spinning process, the core portion was fed with room temperature air. The solidified hollow fiber-shaped membrane was continuously withdrawn out of the bath, washed with water, stretched in hot water, and dried.

The results of evaluation of the properties of the acrylonitrilic separation membranes thus obtained (Nos. 1 to 7) are shown in Table 2.

The membrane properties obtained when the solution for membrane formation was maintained at 62° C. are also shown in Table 2 as No. 8.

As a comparative example, the membrane properties obtained when the temperature of the solution for membrane formation (55° C.; No. 9) was lower than its gellation temperature are also shown in Table 2.

TABLE 2

| Sample No. | Composition of mixed solvent (%) | | | Gellation temp. (°C.) | Solution temp. (°C.) | Membrane properties | | Remarks |
| | DMF | Formamide | Others | | | Water permeation rate (F) | Percent rejection (R) | |
| --- | --- | --- | --- | --- | --- | --- | --- | --- |
| 1 | 68 | 7 | — | 60 | 65 | $2.5 \times 10^{-2}$ | 98.3 | Present invention |
| 2 | 68 | — | Dioxane 7 | <20 | 65 | $5.8 \times 10^{-3}$ | 80.6 | Comparative example |
| 3 | 68 | — | PEG-2000 7 | <20 | 65 | $9.1 \times 10^{-2}$ | 36.0 | Comparative example |
| 4 | 75 | — | — | <20 | 65 | $1.7 \times 10^{-3}$ | 42.8 | Comparative example |
| 5 | 68 | 5 | DMSO 2 | 45 | 65 | $6.7 \times 10^{-2}$ | 93.9 | Present invention |
| 6 | 68 | 5 | DMA 2 | 47 | 65 | $8.1 \times 10^{-2}$ | 91.1 | Present invention |
| 7 | 68 | 5 | CH$_3$OH 2 | 55 | 65 | $1.6 \times 10^{-2}$ | 96.2 | Present invention |
| 8 | 68 | 7 | — | 60 | 62 | $8.4 \times 10^{-2}$ | 93.2 | Present invention |
| 9 | 68 | 7 | — | 60 | 55 | $5.5 \times 10^{-2}$ | 24.4 | Comparative example |

PEG = Polyethylene glycol
DMA = Dimethylacetamide

As apparent from the results in Table 2, the hollow fiber-shaped membranes (Sample No. 1 and No. 5 to No. 8) produced satisfying the conditions recommended in the present invention, of the mixed solvent composition and solution temperature, are remarkably improved in the membrane properties. On the other hand, in those cases where formamide was not contained in the mixed solvent or the temperature of the solution for membrane formation was set up at a temperature lower than the gellation temperature (No. 2 to No. 4, and No. 9), the membranes obtained did not satisfy both water permeation rate and rejection ability, and therefore they were not sufficient for practical use.

The separation membranes of sample No. 1 and No. 5 to No. 8 had an excellent water-resistance, mechanical strength, and chemical resistance.

EXAMPLE 2

An acrylonitrile separation membrane (No. 10) was produced according to the same method as in Sample No. 1 of Example 1 except that the solution for membrane formation was immediately subjected to solvent removal treatment without passing through air. The properties of the membrane were as follows:

Water permeation rate = $3.4 \times 10^{-2}$
$m^3/m^2.day.(kg/cm^2)$

Percent rejection (%) = 95.6%

The above data show that so far as the process of the present invention is employed, whether the sol membrane may be caused to pass through air first or may be introduced immediately into the solvent removal treatment bath, it is possible to obtain membranes having well-balanced properties. The separation membrane of Sample No. 10 was excellent also in water resistance.

EXAMPLE 3

Twenty five parts of an AN polymer containing 88% AN and 12% vinyl acetate combined therewith having a limiting viscosity [$\eta$] of 0.95 as measured in DMF at 30° C.) was dissolved in 75 parts of each of the mixed solvents shown in Table 3, and the solutions were deaerated to prepare solutions for membrane formation. (The gellation temperatures of the solutions are also shown in Table 3.) Each solution, while being maintained at 65° C., was spun through a sheath-core type spinnerette into air, in which it was caused to travel for a length of 185 mm, and was introduced into a 40% DMF solution (4° C.) to subject it to a solvent removal treatment. During this spinning process, the core portion was fed with a 10% aqueous DMF solution at 20° C. The feed amount of this aqueous solution was maintained at a 1/25 level of the spinning solution. The solidified hollow fiber-shaped membrane was continuously withdrawn out of the bath, washed with water, stretched in hot water (stretching ratio 1.05 times), and dried.

The results of evaluation of the membrane properties of the acrylonitrile separation membranes thus obtained (No. 11 to No. 17) are shown in Table 3.

The membrane properties obtained when the solution for membrane formation was maintained at 62° C. are also shown in Table 3 as No. 18.

As a comparative example, there are also shown in Table 3 the membrane properties obtained when the temperature of the solution for membrane formation (55° C.; No. 19) was lower than the gellation temperature.

As apparent from the results in Table 3, the hollow fiber-shaped membranes (Sample No. 11 and No. 15 to No. 18) produced satisfying the conditions, recommended in the present invention, of the mixed solvent composition and solution temperature, are remarkably improved in the membrane properties. On the other hand, in those cases where formamide was not contained in the mixed solvent or the temperature of the solution for membrane formation was set up at a temperature lower than the gellation temperature (Sample No. 12 to No. 14 and No. 19), the membranes obtained did not satisfy both water permeation rate and rejection ability, and therefore they were not sufficient for practical use.

The separation of membranes of Sample No. 11 and No. 15 to No. 18 had an excellent water resistance, mechanical strength, and chemical resistance.

EXAMPLE 4

An acrylonitrile separation membrane (No. 20) was produced according to the same method as in Sample No. 11 of Example 3 except that the solution for membrane formation was immediately subjected to solvent removal treatment without passing through air. The properties of the membrane were as follows:

Water permeation rate = $3.6 \times 10^{-2}$
$m^3/m^2.day.(kg/cm^2)$

Percent rejection = 95.1%

The above data show that so far as the process of the present invention is employed, whether the sol membrane may be caused to pass through air first or may be introduced immediately into the solvent removal treatment bath, it is possible to obtain membranes having well-balanced properties. The separation membrane of Sample No. 20 was excellent also in water resistance.

EXAMPLE 5

Acrylonitrilic hollow fiber-shaped membranes (Nos. 21-24) were produced according to the same method as used in Sample No. 11 of Example 3 except that the solvent removal condition (the outer bath i.e. Medium A) for the hollow fiber-shaped membranes was changed as mentioned in Table 4. The properties of these membranes are shown in Table 4.

TABLE 3

| Sample No. | Composition of mixed solvent (%) | | | Gellation temp. (°C.) | Solution temp. (°C.) | Membrane properties | | Remarks |
|---|---|---|---|---|---|---|---|---|
| | DMF | Form-amide | Others | | | Water permeation rate (F) | Percent rejection (R) | |
| 11 | 68 | 7 | — | 60 | 65 | $2.6 \times 10^{-2}$ | 98.1 | Present invention |
| 12 | 68 | — | Dioxane 7 | <20 | 65 | $6.0 \times 10^{-3}$ | 80.2 | Comparative example |
| 13 | 68 | — | PEG 7 | <20 | 65 | $9.5 \times 10^{-2}$ | 33.6 | Comparative example |
| 14 | 75 | — | — | <20 | 65 | $1.9 \times 10^{-3}$ | 41.9 | Comparative example |
| 15 | 68 | 5 | DMSO 2 | 45 | 65 | $6.9 \times 10^{-2}$ | 93.2 | Present invention |
| 16 | 68 | 5 | DMA 2 | 47 | 65 | $8.6 \times 10^{-2}$ | 90.7 | Present invention |
| 17 | 68 | 5 | $CH_3OH$ 2 | 55 | 65 | $1.7 \times 10^{-2}$ | 95.5 | Present invention |
| 18 | 68 | 7 | — | 60 | 62 | $8.8 \times 10^{-2}$ | 92.8 | Present invention |
| 19 | 68 | 7 | — | 60 | 55 | $6.0 \times 10^{-2}$ | 23.0 | Comparative example |

TABLE 4

| Sample No. | Membrane production condition (outer bath) | | Membrane properties | | Remarks |
|---|---|---|---|---|---|
| | Concentration of water-soluble solvent (%) | Temperature (°C.) | Water permeation rate (F) | Percent rejection (R) | |
| 21 | 40 | 15 | $3.8 \times 10^{-2}$ | 92.2 | Invention |

TABLE 4-continued

| Sample No. | Membrane production condition (outer bath) | | Membrane properties | | Remarks |
|---|---|---|---|---|---|
| | Concentration of water-soluble solvent (%) | Temperature (°C.) | Water permeation rate (F) | Percent rejection (R) | |
| 22 | 40 | 18 | $7.5 \times 10^{-2}$ | 60.7 | Comparative example |
| 23 | 20 | 15 | $5.4 \times 10^{-2}$ | 88.6 | Invention |
| 24 | 17 | 15 | $1.09 \times 10^{-1}$ | 49.3 | Comparative example |

As apparent from Table 4, the hollow fiber-shaped membranes (Sample No. 21 and No. 23) produced following the solvent removal condition of the present invention had improved membrane properties.

EXAMPLE 6

Acrylonitrile hollow fiber-shaped membranes (No. 25 to No. 30) were produced according to the same method as used for Sample No. 11 of Example 3, except that the solvent removal condition (the condition of Medium B introduced into the hollow portion of the hollow fiber-shaped membranes) was changed as mentioned in Table 5. The properties of the obtained membranes are shown in Table 5.

TABLE 5

| Sample No. | Membrane production condition (hollow portion) | | Membrane properties | | Remarks |
|---|---|---|---|---|---|
| | Concentration of water-soluble solvent (%) | Temperature (°C.) | Water permeation rate (F) | Percent rejection (R) | |
| 25 | 10 | 10 | $2.2 \times 10^{-2}$ | 98.8 | Invention |
| 26 | 10 | 0 | $1.6 \times 10^{-2}$ | 99.1 | Invention |
| 27 | 10 | −3 | $5.6 \times 10^{-3}$ | 99.4 | Comparative example |
| 28 | 30 | 20 | $2.1 \times 10^{-2}$ | 99.2 | Invention |
| 29 | 50 | 20 | $1.8 \times 10^{-2}$ | 99.0 | Invention |
| 30 | 55 | 20 | $2.3 \times 10^{-3}$ | 99.2 | Comparative example |

From the results shown in Table 5, it is understood that the hollow fiber-shaped membranes (Sample Nos. 25, 26, 28 and 29) produced according to the solvent removal treatment condition of the present invention had improved membrane properties. The separation membranes of Sample Nos. 25, 26, 28 and 29 were satisfactory both in water resistance and in mechanical strength.

EXAMPLE 7

An acrylonitrilic hollow fiber-shaped membrane (No. 31) was produced following the same method as in Sample No. 11 of Example 3, except that air (inert medium) was introduced into the hollow portion of the hollow fiber-shaped membrane. The supply of air was maintained at an amount which does not bring about a remarkable ballooned state like Barus effect. The properties of the membrane thus obtained were as follows:

Water permeation rate = $1.1 \times 10^{-2}$
 $m^3/m^2.day.(kg/cm^2)$

Percent rejection ratio = 97.3%

It is understood therefore that the separation membrane produced by introducing an inert medium into the hollow portion according to the method of the present invention has a well-balanced membrane properties.

EXAMPLE 8

A solution for membrane formation corresponding to Sample No. 16 of Example 3, while being maintain at 65° C., was spun through a spinnerette for flat membrane production having a suitable slit. After it was caused to travel through air for a length of 180 mm, one side of the flat membrane obtained was brought into contact with a 30% aqueous DMF solution (5° C.) and the other side was brought into contact with a 10% aqueous DMF solution (20° C.) to subject the membrane to solvent removal treatment. The solidified flat membrane was continuously withdrawn out of the bath, washed with water, biaxially stretched in hot water (stretching ratio 1.1 times) and dried. The acrylonitrilic separation membrane thus obtained (Sample No. 32) was also satisfactory in membrane properties.

Water permeation rate = $2.1 \times 10^{-2}$
 $m^3/m^2.day.(kg/cm^2)$

Percent rejection ratio = 92.2%

The measurement of the water permeation rate of this flat membrane was performed in accordance with the above-mentioned measuring method.

What we claim is:

1. A process for producing acrylonitrilic hollow fiber, which comprises dissolving an acrylonitrile polymer in formamide-containing dimethylformamide to prepare an acrylonitrile polymer solution containing more than 80 wt.% of acrylonitrile units, the molecular weight of said acrylonitrile polymer expressed by $[\eta]$ as measured in DMF at 30° C., being 0.4–4 and the concentration of said acrylonitrile polymer in said solution being from 10 to 35 wt.% based on the weight of said solution; shaping said polymer solution into a hollow fibrous product while maintaining the temperature of the solution at a temperature above the gellation temperature, determining the gellation temperature by the following procedure: pouring about 150 to 180 g of a sample solution into a beaker which is about 5.5 cm in diameter and about 11 cm in height; dipping said beaker into a temperature-controlled water bath maintained at the same temperature level as the dissolution temperature, then lowering the temperature of the solution at the rate of about 10° C./hour, accompanied by lowering the temperature of the water bath, and at a given point in time during this temperature lowering, placing a glass rod which is 3 mm in outer diameter and 2.5 g in weight, vertically on the surface of the solution while being supported lightly at its upper portion by a ring-shaped holder, then permitting the glass rod to penetrate into the solution under the action of its own weight and sinking, measuring the time elapsed until a sinking depth of 5 cm is attained, and employing the solution temperature at which the time elapsed first exceeds 5 seconds as the gellation temperature of the solution; bringing the surface layer of the hollow fibrous product into contact with an aqueous solution, at a temperature below 10° C., containing more than 30 wt.% of a water-soluble solvent compatible with the mixed solvent, said aqueous solution being referred to as solvent removal treatment medium A, immediately or after bringing it into contact with an inert atmosphere; bringing the core of the hollow fibrous product immediately into contact with an aqueous solution, at a temperature above 10° C., containing less than 30 wt.% of a water-soluble solvent compatible with said mixed solvent or an inert medium, said aqueous solution or said inert medium being referred to as solvent removal treatment medium B, or bringing it into contact with said solution after bringing it into contact with an inert atmosphere, thereby removing the solvent; and then stretching the solidified fiber thus obtained.

2. The process as claimed in claim 1 wherein the mixing ratio of formamide and dimethylformamide is from 1/99 to 28/72.

3. The process as claimed in claim 1 wherein the concentration of the acrylonitrile polymer in the solution for membrane formation is from 20 to 30 weight % based on the total weight of the solution.

4. The process as claimed in claim 1 wherein the temperature of the solution for membrane formation is 1° to 50° C. higher than the gellation temperature.

5. The process as claimed in claim 1 wherein the stretching temperature is higher than 50° C.

6. The process as claimed in claim 1 or claim 5 wherein the stretching temperature is higher than 80° C.

7. The process as claimed in claim 1 wherein the membranous product is stretched from 0.8 to 1.5 times in length, monoaxially or biaxially.

8. The method according to claim 1 wherein an inert atmosphere is employed at a temperature of between room temperature and 150° C.

* * * * *